Dec. 26, 1933.          P. M. LINCOLN                1,940,759
                    THERMAL ELECTRIC METER
                    Filed Oct. 26, 1931        2 Sheets-Sheet 1

Inventor
Paul M. Lincoln.

Dec. 26, 1933.  P. M. LINCOLN  1,940,759
THERMAL ELECTRIC METER
Filed Oct. 26, 1931  2 Sheets-Sheet 2

Inventor.
Paul M. Lincoln.

Patented Dec. 26, 1933

1,940,759

UNITED STATES PATENT OFFICE 1,940,759

THERMAL ELECTRIC METER

Paul M. Lincoln, Ithaca, N. Y.

Application October 26, 1931. Serial No. 571,117

7 Claims. (Cl. 171—270)

The principal objects of this invention are, to devise a more efficient type of instrument for measuring electrical current, in that an extremely sensitive and accurate responsive element is provided, and further to provide such an instrument that will compensate for the relation between the watts lost in a given body and the temperature rise of that body and thereby compensate for temperature error.

The principal feature of the invention consists in the novel construction and use of a flexible fluid-containing "Bourdon" tube having the coiled free end operatively connected with an indicating element and the other end connected to a sealed reservoir containing a liquid whose volumetric response to changes in temperature is of a characteristic which will correct the non-linear characteristic of the dissipation of heat from a heated body, said reservoir having heat applied thereto varying with the flow of current to be measured.

In the drawings, Figure 1 is a diagrammatic illustration of an apparatus constructed in accordance with this invention.

Figure 1:
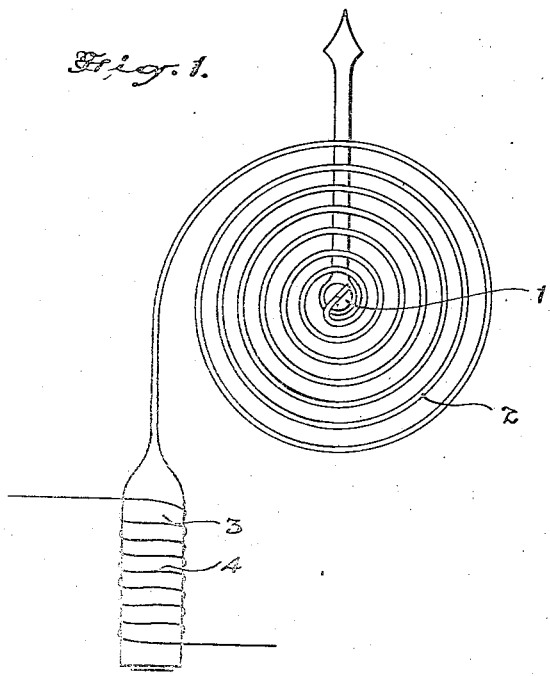
Figure 2:
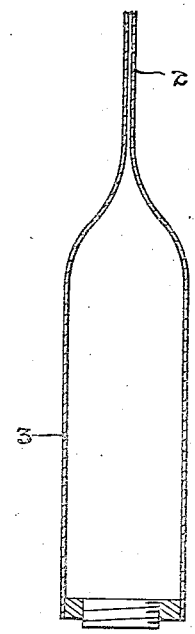
Figure 2 is an enlarged sectional detail of a portion of the reservoir and flexible meter element.
Figure 3:
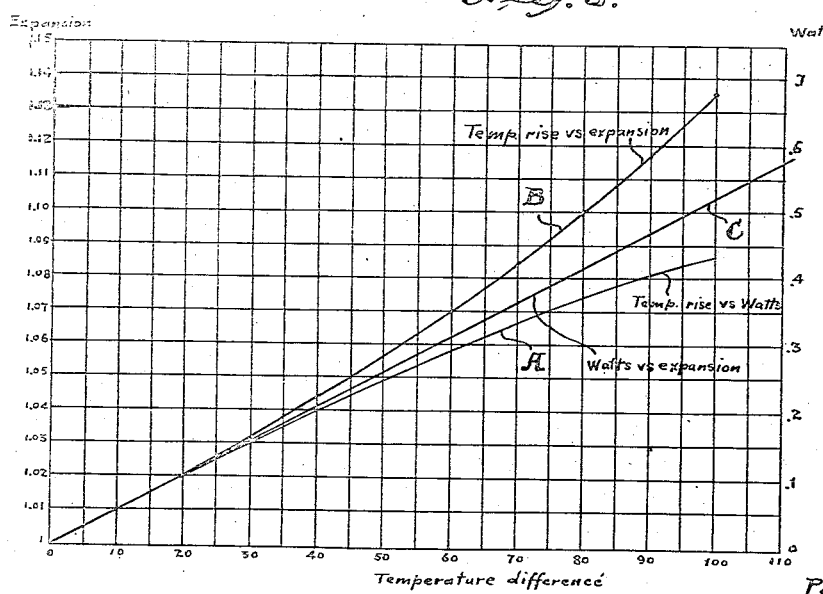
Figure 3 is a curve sheet illustrating the effect of temperature variations.

In the measuring of electrical current through thermal mediums it is important that the device for registering the changes of temperature, due to current flow, be of such a nature as to compensate for errors caused by change of atmospheric temperature surrounding the instrument which varies to a considerable extent and in the present invention this defect is largely overcome.

In the application of the invention the indicator spindle 1 is attached to the inner end of a helically or spirally wound tubular element 2 which is formed of thin flexible metal flattened to form a thin broad tube and such tube is made of a suitable spring material, steel having been found to be quite effective, though other spring metal may be desirable for certain uses.

A reservoir 3 is connected with the spiral element 2 and contains a quantity of a fluid which expands readily in response to temperature rise. This reservoir is here shown as an integral part of the tube 2 and is of cylindrical form, being an unflattened portion of the tube but it will be understood that other constructions may be devised. The reservoir and tube 2 are preferably filled with the fluid to the exclusion of air and then suitably sealed, though the total exclusion of air is not necessary.

A heater element 4, through which the electrical current to be measured flows, is arranged in close thermal association with the reservoir 3, it being preferably wound therearound and by such arrangement one phase of temperature error is eliminated.

The major feature in the elimination of temperature error is to a great extent overcome in this invention by the use of a suitable expansible liquid or mixture of liquids which has the desired feature of compensation, this feature may be found in any of the alcohols, hydrocarbon oils, carbon tetrachlorid, ether or the like.

Figure 4:
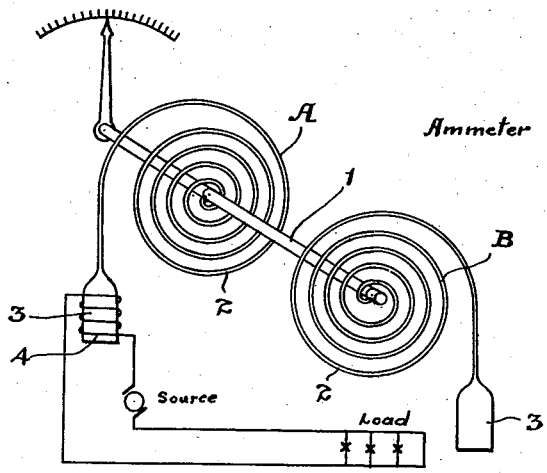
Figure 4 is a diagrammatic illustration of the application of the invention to an ammeter.
Figure 5:
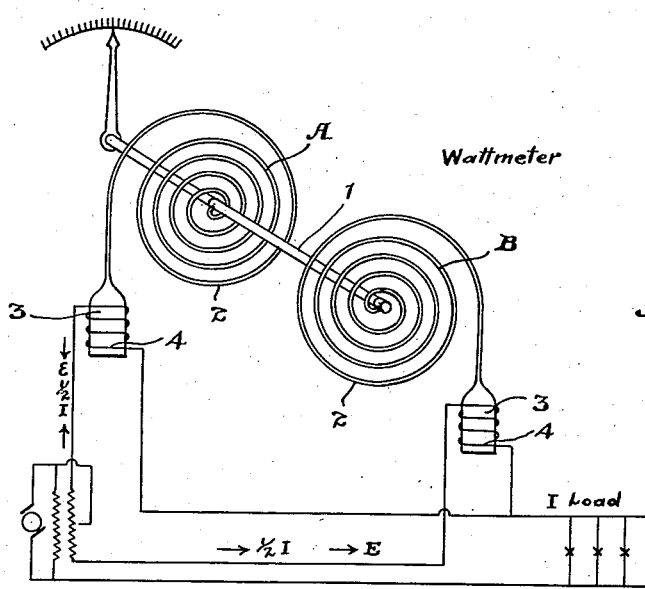
Figure 5 is a diagram similar to Figure 4 of a wattmeter.

In the diagrams Figures 4 and 5 the practical application of the invention is shown in the arrangement of a pair of spiral tubes A and B, constructed as described, and connected to the spindle 1 opposing each other. The opposed arrangement of similar elements will of course eliminate any indication due to atmospheric temperature changes.

It is understood and recognized in the art that the relation between temperature rise and watts lost in a given body is represented graphically by a curve, that is, that a given wattage will raise the temperature of a given body to a given amount, but if the wattage be double the temperature of the same body will be raised to something less than double that amount.

In the curve sheet illustrated herewith the curve A indicates the relation between temperature rise and watts in a given body and it will be noted that the curve is depressed as the temperature rises. The curve B indicates the expansion of methyl alcohol which rises in proportion to an increase in temperature.

The line C is a straight line between these two curves. If the curve A diverges from the straight line C just as fast as the curve B diverges in the opposite direction from the straight line there will be complete conpensation in the use of a properly expanding liquid in the expansion element of the thermal watt meter. As far as can be ascertained methyl alcohol departs from a straight line expansion curve, more than any other suitable liquid but as has been pointed out there are of course other expansile liquids which might be used in such an apparatus and it is not intended that this invention should be limited to the use of any particular liquid.

It will be readily understood that upon the application of temperature to the heater 4 through the passage of current therethrough that the heat developed will be transmitted to the reservoir which it encircles and therefore to the larger body of liquid contained therein.

The expansion of this large body of liquid is conveyed by the thin ribbon or stratum of liquid extending throughout the length of the spirally wound flattened tubular spring and the pressure exerted by such expansion causes the spring to endeavour to straighten out, thus applying a rotary movement to the indicator spindle 1.

It has been previously proposed to apply heat to a liquid filled "Bourdon" tube and through the resultant expansion to operate an indicator to measure the current flow, but the present invention is a very distinct advance over such proposal in that the temperature is applied to a comparatively large body of an expansile fluid responsive to temperature and the expansive force is transmitted throughout the length of a spring element to effect the operation of the indicator.

It will thus be seen that the operation of the device will be extremely sensitive and further that the applied temperature from the heater is retained in a concentrated area and therefore affected to the minimum extent by surrounding atmospheric temperatures.

These features when combined with the use of a fluid of a highly expansile quality and one that has a proper relation between temperature and volume reduces the temperature errors to a negligible quantity.

What I claim as my invention is:—

1. An improved thermal watt meter comprising, in combination an indicator, a tubular spring element connected with said indicator, a reservoir connected with said tube, an expansile liquid filling said reservoir and tube, and a heater connected with an electrical supply and arranged to influence the volumetric condition of said liquid, said liquid having a greater expansive effort than said tubular spring under the applied heat condition for the purpose of compensating for the inherent expansion lag of said tubular spring, whereby an accurate indication of the flow of electric current through said heater will be obtained.

2. A thermal electric meter, comprising in combination a rotatable indicator, a spirally wound tube connected to said indicator to rotate the same and subject to an inherent expansion lag, a sealed reservoir connected with the free end of said tube, an expansile liquid filling said tube and reservoir, and an electric heater element arranged to influence the volumetric quality of said liquid, said liquid having an expansion curve diverging from a straight line in opposition to the divergence due to expansion lag of the spiral tube.

3. In an electric meter, a rotatable indicator, a pair of oppositely wound spiral spring tubes each operatively connected with said indicator, reservoirs connected with said tubes, said tubes and reservoirs being filled with an expansile liquid, and means for applying heat to unbalance said spiral springs in response to the flow of electrical energy, said liquid having a co-efficient of expansion greater than and definitely related to that of the spring tubes under the influence of said applied heat.

4. An electric meter, comprising in combination an indicator, a spirally coiled spring tube having its inner end connected with said indicator, a reservoir connected to the opposite end of said tube and opening thereto and sealed at its outer end, an expansile liquid enclosed within said reservoir and tube, and an electric heater coil surrounding said reservoir, said expansile liquid having a predetermined expansive value relative to that of the tube for the purpose of off-setting inherent expansive inefficiency of the latter, whereby an accurate indication of the flow of electric current through said heater will be obtained.

5. In a watt meter, a rotatable indicator, a pair of oppositely wound spiral spring tubes each having its inner end operatively connected with said indicator, a pair of liquid reservoirs containing an expansile liquid and each connected with the outer end of each of said tubes, and a pair of electric heaters each connected with the source of electrical supply and arranged to apply heat to each of said reservoirs said expansile liquid having a predetermined expansion value relative to the tube in which it is contained for the purpose of offsetting inherent expansive inefficiency of the latter, whereby an accurate indication of the flow of electric current in the respective heaters will be obtained.

6. A thermal electric meter, comprising, an indicator, a tubular spring element flat in cross section operatively connected at one end to said indicator, a reservoir sealed to the other end of said tube, an electric heater surrounding said reservoir and developing heat proportional to a flow of current, and a liquid sealed in said reservoir and tubular element having a volumetric response to change of temperature of a characteristic which will correct the non-linear characteristic of the dissipation of heat from the tubular enclosing element.

7. In an electric meter, the combination with a current flow to be measured, of a temperature-pressure responsive element comprising a length of metal tubing integral from end to end, said tubing being flattened for the major portion of its length to impart a ribbon-like interior cross section thereto, said flattened portion being wound into coiled form, an expansile liquid filling the interior of the flattened and non-flattened portions of said tube, means for applying heat to said tube and liquid in proportion to the flow of electrical current to be measured, and indicating means actuated by the resultant displacement of said tube, said liquid having a predetermined expansive value relative to said tube for the purpose of offsetting the expansive inefficiency of the latter, whereby an accurate indication of the current flow is obtained.

PAUL M. LINCOLN.